United States Patent [19]

Hofmann et al.

[11] Patent Number: 4,523,520
[45] Date of Patent: Jun. 18, 1985

[54] MEAT PROCESSING EQUIPMENT

[75] Inventors: Richard E. Hofmann, Pittsburgh; Robert G. Hofmann, Jr., Allison Park, both of Pa.

[73] Assignee: North Side Packing Company, Pittsburgh, Pa.

[21] Appl. No.: 571,563

[22] Filed: Jan. 17, 1984

[51] Int. Cl.³ .............................................. A47J 37/06
[52] U.S. Cl. ........................................ 99/352; 99/353; 99/355; 99/386; 99/395; 99/443 C; 99/446; 126/39 J; 126/41 C; 126/92 R; 426/523; 432/225; 198/406
[58] Field of Search ..................... 99/443 C, 446, 352, 99/353, 355, 395, 386; 126/39 J, 41 C, 41 B, 40, 92 R; 432/3, 225, 229, 231; 198/402, 406; 426/523

[56] References Cited

U.S. PATENT DOCUMENTS

| | | | |
|---|---|---|---|
| 2,529,253 | 11/1950 | Hoffman | 99/395 X |
| 3,041,959 | 7/1962 | Oyler | 99/446 X |
| 3,491,679 | 1/1970 | Kelly | 99/443 C |
| 3,721,178 | 3/1973 | Szabrak | 99/355 X |
| 4,213,380 | 7/1980 | Kahn | 99/353 X |
| 4,444,558 | 4/1984 | Kinto | 432/225 |

FOREIGN PATENT DOCUMENTS 1403490 8/1975 United Kingdom ............... 432/225

Primary Examiner—Billy J. Wilhite
Attorney, Agent, or Firm—Webb, Burden, Robinson & Webb

[57] ABSTRACT

A continuous meat processing line having a patty-forming machine at the inlet end, a cooking portion, a transfer section, a quick freeze section and a packing section at the outlet end. The cooking portion has a first cooking section adjacent to the patty-forming machine and a second cooking section in line with the first cooking section. Each cooking section has a conveyor belt for moving patties through the cooking section. A plurality of heating units are spaced above the conveyor belt in each cooking section and a plurality of individual radiant heaters are located in each heating unit. A water tray is located below each conveyor belt and a drain trough is connected with the water trays.

30 Claims, 10 Drawing Figures

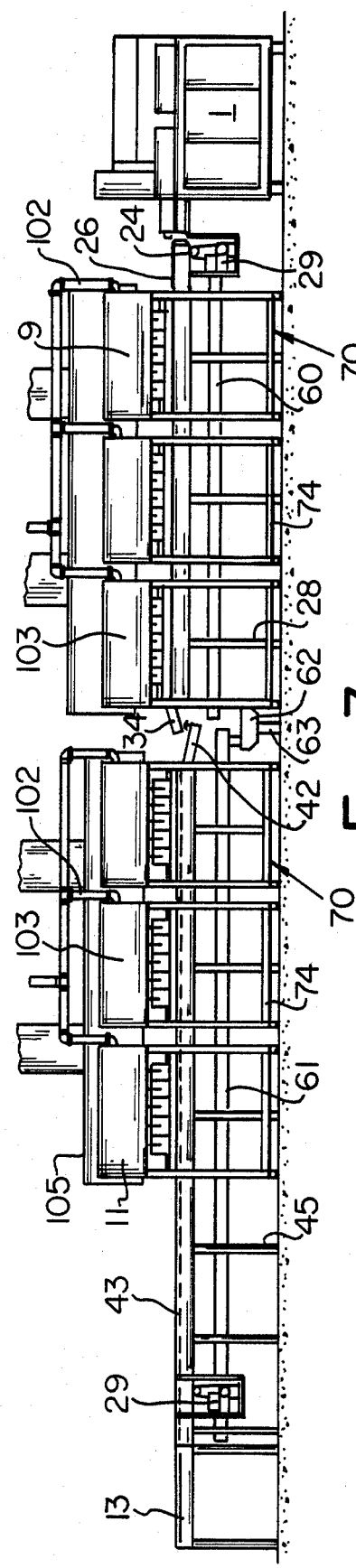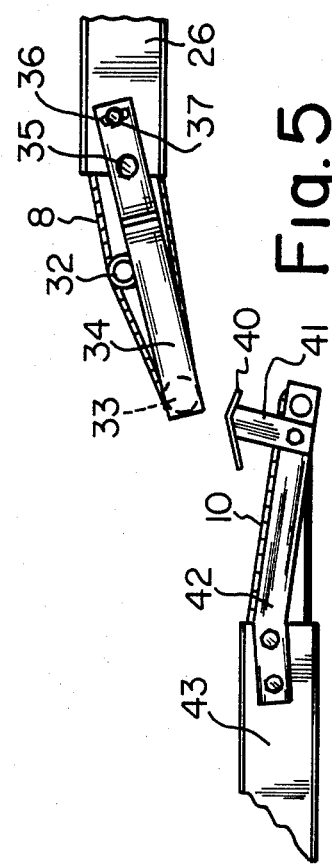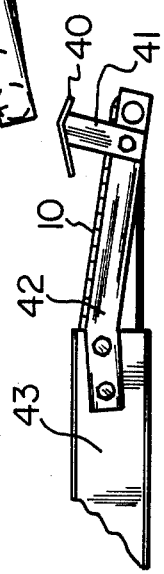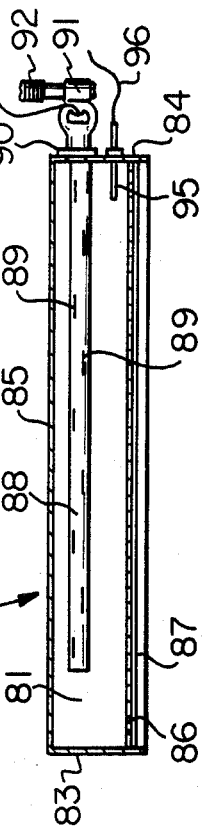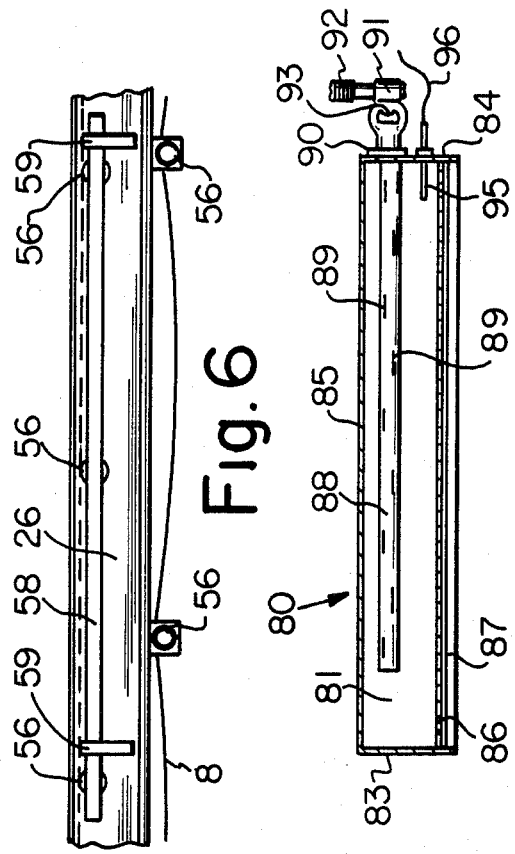

MEAT PROCESSING EQUIPMENT

BACKGROUND OF THE INVENTION

1. Field of the Invention

The invention relates generally to processing equipment for ground meat and more particularly to a processing line for transforming ground pork into fully cooked, frozen sausage patties. In the manufacture of sausage patties, it is important that the ground pork be thoroughly cooked prior to freezing to control trichina, to extend product shelf life, and to facilitate restaurant patty preparation while at the same time maintaining a consistent color throughout the surface of a heated patty for consumption in a restaurant.

In the known sausage processing lines, ground pork is formed into patties which are passed through a steaming area which simultaneously cooks both sides of the patties after which they are quick frozen. When a patty is to be heated for consumption in a restaurant, it is removed from the cooler and placed directly upon a grill and heated to the desired temperature for consumption. However, patties which are steam cooked prior to quick freezing have an uneven speckled white color which is unappetizing to the customer because the patty looks as if it is not completely cooked.

SUMMARY OF THE INVENTION

The invention is a processing line wherein ground pork is placed in a patty-forming machine which forms patties and deposits them on a conveyor which passes under a series of radiant heaters in a first cooking section to cook the upper portion of each patty. Each patty is then transferred to another conveyor and turned over so that the cooked side is facing downwardly, and the uncooked side is facing upwardly after which it is passed under another series of radiant heaters in a second cooking section to cook the upper portion of the patty. Cooking takes place at temperatures on the order of 1700° F. The fully cooked patty is again turned over and is passed through a quick freeze tunnel wherein it is frozen at temperatures below 10° C. The patties are completely cooked prior to freezing to control trichina and to simplify restaurant preparation. The frozen patties pass over a metal detector table and are packaged after which they are shipped to a cold storage warehouse for subsequent distribution to restaurants where they are heated on a grill to consumption temperature. Patties processed according to the invention have a consistent tan color throughout and are therefore appealing to the restaurant customers.

BRIEF DESCRIPTION OF THE DRAWINGS

FIG. 3 is a side elevation of the cooking side of the processing line:

FIG. 5 is a side view of the patty turning arrangement between the two sections of the cooking side of the processing line;

FIG. 6 is a partial side elevation of the belt support mechanism on the cooking side of the processing line;

FIG. 7 is a side elevation of the arrangement for turning the patties after cooking is completed;

FIG. 10 is a section through an individual heater on line X—X of FIG. 8.

DESCRIPTION OF THE PREFERRED EMBODIMENT

Figure 1:
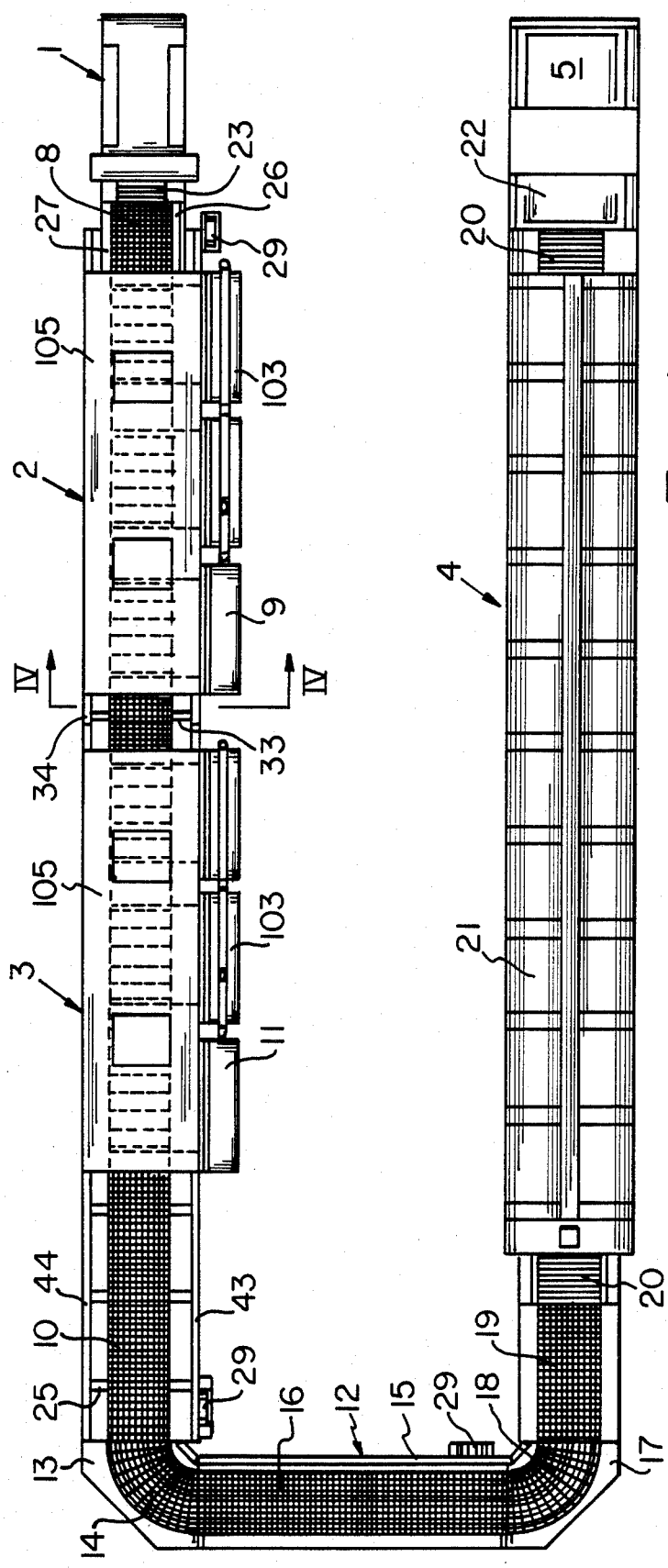
FIG. 1 is a plan view of a processing line according to the invention.
Figure 2:
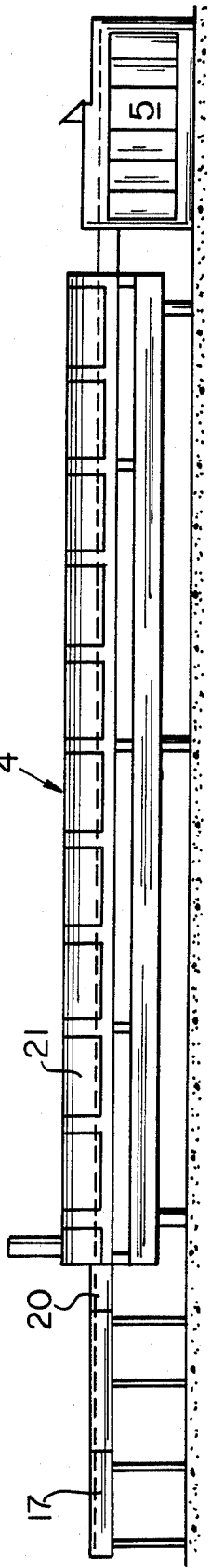
FIG. 2 is a side elevation of the freeze side of the processing line.
Figure 8:
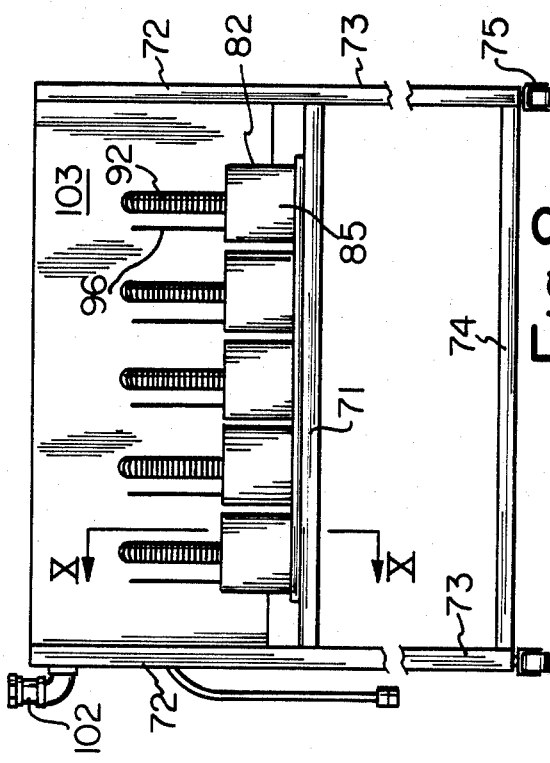
FIG. 8 is a front elevation of a heating unit.

With reference to FIGS. 1-3 of the drawings, the processing line has a patty-forming machine 1 at the inlet end, a first cooking section 2, a second cooking section 3 aligned with first cooking section 2, a freeze section 4 and a packing section 5 at the outlet end. The first cooking section 2 includes a continuous wire conveyor belt 8 which receives the patties from the discharge conveyor on patty-forming machine 1 and moves the patties beneath a plurality of radiant heating units 9. The second cooking section 3 has a continuous wire conveyor belt 10 which receives the partially cooked patties from cooking section 2 and moves the patties beneath a plurality of radiant heating units 11. Conveyor belt 10 discharges completely cooked patties onto a transfer section 12 which transfers the patties to freeze section 4. Transfer section 12 consists of a first right angle section 13 having a conveyor belt 14. The patties pass from right angle section 13 onto a conveyor belt 16 in a straight section 15 which moves the patties to a second right angle section 17 having a conveyor belt 18. The patties pass from conveyor belt 18 onto the conveyor belt 19 in freezer section 4. Conveyor belt 19 moves the patties onto the freezer conveyor 20 which passes through the freeze tunnel 21 to discharge the frozen patties onto a metal detector table 22 from which they are removed and packed into containers of the desired size. Freeze tunnel 21 has a plurality of aligned freezer units which freeze with liquid nitrogen. The freezer units are commercially available and are sold under the registered trademark CRYO-QUICK by Air Products and Chemicals, Inc. located in Allentown, Pa. While the processing line is shown in FIG. 1 of the drawings as having a U shape in plan, it should be understood that the shape is dictated by the size of the room where the line is located and is not critical in the operation of the equipment so long as the line is continuous.

The patty machine 1 is a commercially available machine which is sold under the registered trademark FORMAX by Formax, Inc. located in Mokena, Ill. This machine takes a mixture of raw ground sausage and spices which is placed into a supply hopper at the inlet end of the machine and forms a plurality of patties which are arranged across the width of the machine in a line and are placed on discharge conveyor 23 which is a part of the FORMAX machine. Conveyor 23 transfers the line of patties onto conveyor belt 8 in the first cooking section 2.

Conveyor belt 8 is a commercially available continuous wire conveyor belt sold under the registered trademark FLAT-FLEX by Wire Belt Company of America located in Winchester, Mass. This conveyor belt passes over a drive shaft 24 having a standard sprocket drive which is located at the inlet end of cooking section 2 and passes over a plurality of upper belt support rollers 25 which are supported in front side rail 26 and rear side rail 27 of the conveyor frame. The side rails are supported on vertical legs 28 which rest on the floor of the processing room. Drive shaft 24 carrying the sprocket drive is driven by an electric motor 29 and a drive chain extending between the sprocket drive on drive shaft 24 and a gear on the motor output shaft. The sprocket drive and drive motor therefor are well-known in the art and are not part of the present invention.

The discharge end of conveyor belt 8 passes over a pair of rollers 32 and 33 which are carried on spaced vertically adjustable support arms 34 which are pivotally attached to side rails 26 and 27 of the conveyor frame in the manner shown in detail in FIG. 5 of the drawings. Adjustable support arms 34 are attached to the side rails by pivot pins 35. An arcuate slot 36 is provided in each support arm 34, and a threaded locking pin 37 extends outwardly from each side rail 26 and 27 through an arcuate slot 36 in a support arm 34. A nut is provided on each threaded pin 37 so that arms 34 can be pivoted about pins 35 to raise and lower rollers 32 and 33 to adjust the height of the discharge end of conveyor belt 8 above the inlet end of conveyor belt 10. When the rollers are in the desired position, the nuts are tightened on threaded pins 37 to hold arms 34 in position.

The patties which enter cooking section 3 from cooking section 2 drop from the discharge end of conveyor belt 8 onto a deflector 40 which extends across the width of conveyor belts 8 and 10 and is mounted on a pair of spaced arms 41 which are attached to spaced brackets 42 which are bolted to the side rails 43 and 44 of the conveyor frame of second cooking section 3. The side rails 43 and 44 are supported by vertical legs 45. The patties are turned over by their contact with deflector 40 so that in cooking section 3 the side which was cooked in cooking section 2 is facing downwardly, and the uncooked side is facing upwardly. The patties fall onto the end of conveyor belt 10 and pass beneath a plurality of radiant heating units 11 where cooking is completed.

After the patties are cooked in cooking section 3, they pass onto conveyor belt 14 in right angle section 13. As the patties are discharged from the end of conveyor belt 14, they contact a deflector 50 which is shown in FIG. 7. The deflector 50 extends across conveyor belts 14 and 16 and is mounted on spaced arms which are attached to brackets 52 attached to the side rails of the conveyor frame for straight section 15. The purpose of dropping the cooked patties onto deflector 50 is to turn the patties over on conveyor belt 16. This is important since the patties may be cupped upwardly to a slight extent as they pass out of second cooking section 3, and they must be substantially flat before they are frozen in order to insure that they will not crack when they are packaged after freezing.

The patties pass from the conveyor belt 16 in straight section 15 onto conveyor belt 18 in right angle section 17 from which they are transferred to conveyor belt 19. Conveyor belt 19 transports the patties to freezer conveyor 20 which takes the patties through freeze tunnel 21 in freezing section 4. When the patties are discharged from freeze section 4, they pass onto metal detector table 22 in packing section 5 from which they are manually removed and packed in containers.

Figure 4:
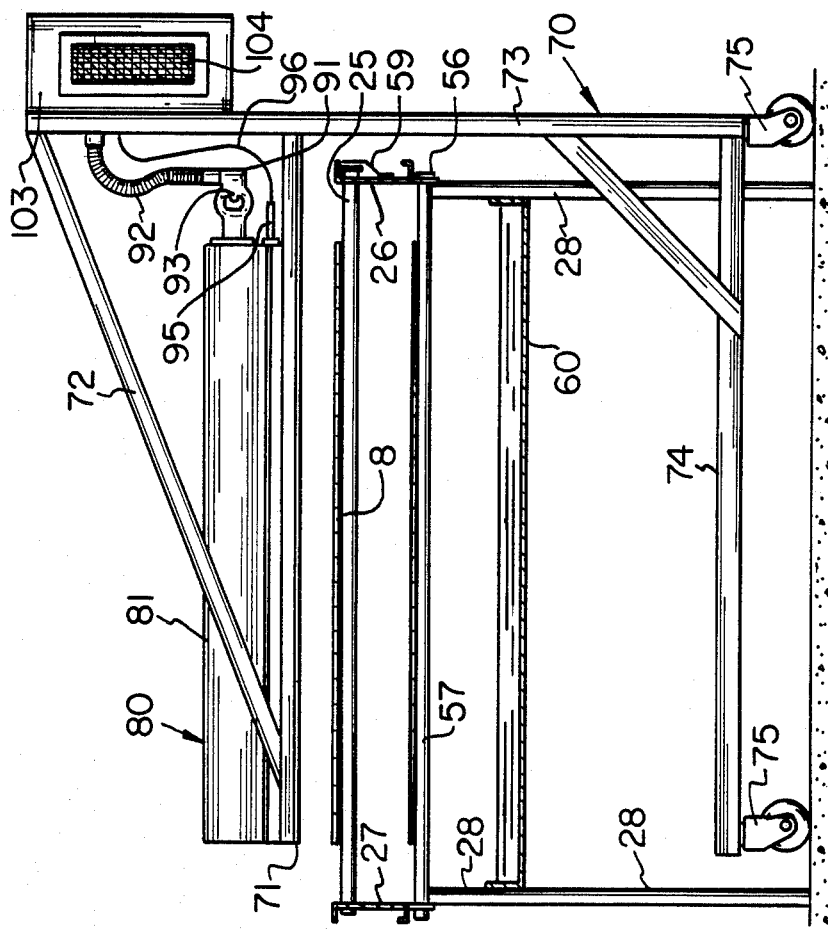
FIG. 4 is an end elevation of the cooking side of the processing line on line IV—IV of FIG. 1.

With specific reference to FIGS. 4 and 6 of the drawings it will be seen that the upper belt support rollers 25 and the lower belt support rollers 57 are formed with a flange 56 at one end. The reason for the flange on one end of each belt support roller is to permit the rollers to pass through aligned openings in opposed side rails 26 and 27 in first cooking section 2 and 43 and 44 in second cooking section 3 while permitting the rollers to expand longitudinally without exerting any stress on the side rails. The upper belt support rollers 25 are retained in position by elongated stop members 58 which are held on the outer surface of side rail 26 and side rail 43 by spaced upwardly opening brackets 59. The stop members 58 are loosely held in place by brackets 59 so that the rollers 25 can expand longitudinally and the flanges 56 will contact the inner surface of stop member 58 to prevent the far end of the roller from falling out of the opening in side rails 27 and 44. If the support rollers are not loosely mounted in the aligned openings in the side rails, longitudinal expansion will cause the rollers to sag or bow or to distort the side rails. The lower rollers 57 are carried in downwardly depending tabs which are part of the side rails and do not require stop members because the heat on the lower rollers is considerably less than that on the upper rollers since the heat is absorbed by the water in water trays 60 and 61. The water trays are attached to the conveyor frame legs.

The water tray 60 beneath cooking section 2 and the water tray 61 beneath cooking section 3 are essential because the water absorbs the heat from the radiant heaters in the heating units. Additionally, the water catches grease which drops from the patties during cooking. If water trays are not positioned below the radiant heating units, the heat damages the floor of the room where the processing line is located and heats the legs of the conveyor frame to such an extent that they warp and twist. The temperature at the upper belt where the patties are cooked is on the order of 1700° F., and the heat absorbed by the water is such that the temperature below the water trays is only slightly above room temperature. The water trays 60 and 61 both empty into a transverse trough 62 which is located between the cooking sections and which has a gravity drain pipe 63 to remove the water and grease so that it can be separated and the pure grease transported to a storage tank.

With reference to FIGS. 4 and 8–10 of the drawings, each heating unit 9 and 11 is basically the same and like reference numerals are used with like parts. The only difference is that the heaters are spaced further from the floor in units 9 because conveyor 8 in cooking section 2 is higher than conveyor 10 in cooking section 3 and a constant distance of 4.75 inches between the surface of the patties and the radiating surfaces of the heaters is necessary to cook the patties as they pass below the heaters on the belt. The reason that conveyor 8 is higher than conveyor 10 is to permit the patties to be turned over as they pass from cooking section 2 to cooking section 3.

Each individual heating unit 9 and 11 has a frame 70 with a horizontal cantilever heater support frame 71 extending therefrom and angle supports 72 extending between the outer end of cantilever support frame 71 and the upper end of a vertical member 73 of frame 70. A lower horizontal frame 74 is parallel to cantilever heater support frame 71, and standard locking casters 75 with wheels are located at each corner of lower support frame 74. The reason that each individual heating unit is mounted on casters is to permit the units to be rolled away from the cooking sections so that the conveyor belts and support rollers can be cleaned. The heating units are moved to another area where they are cleaned. The mobile heating units are necessary since it is essential that the line be cleaned daily.

Each heating unit 9 and 11 has five separate radiant heaters 80 mounted on a cantilever heater support frame 71. Each radiant heater is constructed in the manner shown in FIG. 10 of the drawings and has a housing 81 with imperforate side walls 82, end walls 83 and 84 and top wall 85. The bottom wall of each heater is formed by a porous ceramic member 86 and an outer metal grid 87. An elongated tube 88 extends into the housing 81 and is formed with a plurality of slots 89 located throughout its circumference. The slots are spaced both longitudinally and angularly along tube 88. The tube extends through an opening in rear end wall 84 of housing 81 and is attached to a mounting plate 90 which is bolted to the rear end wall. In order to insure that tube 88 may be easily removed from housing 81 for cleaning the tube and the housing, the diameter of tube 88 is smaller than the diameter of the opening in rear end wall 84. The outer end of tube 88 exteriorly of the mounting plate is open and is attached to a hollow threaded union 91 which is connected with a flexible hose 92 to supply combustion gas to a nozzle 93 which extends out of the union and is spaced from the open end of tube 88. Gas is supplied under pressure through hose 92 and nozzle 93 into a venturi (not shown) located within the open end of tube 88 and entrains atmospheric air as it flows into the end of tube 88. The gas-air mixture flows out of tube 88 through slots 89 into housing 81 and is ignited by a spark igniter 95 which extends through rear end wall 84 of housing 81 below tube 88. The spark ignited is connected to lead 96 which is connected to a capacitor 98 located within control cabinet 103 for each heating unit. The end of each cabinet 103 is provided with a ventilating screen 104 to prevent excessive heat buildup within the cabinet.

Figure 9:
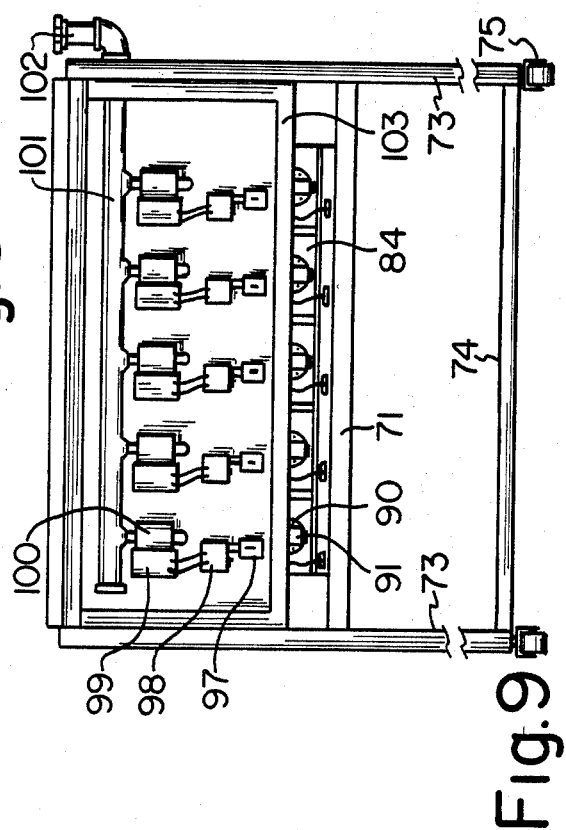
FIG. 9 is a rear elevation of a heating unit.

Each radiant heater 80 is provided with an electric circuit including a manual on-off switch 97, a gas flow control valve 100 operated by a solenoid 99 and a capacitor 98 connected with spark igniter 95 by lead 96. Each solenoid operated valve 100 controls the flow of gas from a manifold 101 to a nozzle 93 for each radiant heater. Manual switch 97 is wired in series with capacitor 98 and solenoid 99 for valve 100 so that gas cannot flow through nozzle 93 into tube 88 and through slots 89 into housing 81 unless spark igniter 95 is actuated. This prevents gas buildup and consequent accidental explosion. As shown in FIG. 9 of the drawings, a gas line 102 is connected to manifold 101 for each heating unit 9 and 11. An exhaust hood 105 is located above each cooking section to remove cooking fumes from the cooking section.

In the operation of the processing line, a row of six sausage patties 0.25 inch thick are supplied across conveyor belt 23 on FORMAX machine 1. The row of six patties is deposited on conveyor belt 8 in cooking section 2 by conveyor belt 23. The patties are cooked on one side as they pass beneath radiant heating units 9 on conveyor belt 8. At the end of conveyor belt 8 the patties are turned over by deflector 40 and fall onto conveyor belt 10 in cooking section 3 with the cooked side facing downwardly and the uncooked side facing upwardly toward radiant heating units 11. The patties pass beneath heating units 11 on conveyor belt 10 in second cooking section 3. Conveyor belt 10 deposits the cooked sausage patties on conveyor belt 14 in right angle section 13. While the patties are traveling beneath the radiant heaters on conveyor belts 8 and 10, the cooking temperature of the patties is on thhe order of 1700° F. The cooking temperature is achieved by spacing the radiant heaters 4.75 inches above the conveyor belts in each cooking section. The cooking time in each section is a function of the thickness of the patties and the linear speed of conveyor belts 8 and 10, and it has been determined that complete cooking of a 0.25 inch thick patty is achieved with a cooking time of 40 seconds in each of the cooking sections.

The completely cooked patties are turned over or flipped as they pass from conveyor belt 14 onto conveyor belt 16 in section 15. Flipping the patties at this point insures that an upwardly directed cup formed in the upper surface of a patty will face downwardly so that the patty will flatten as it passes from the entrance end of conveyor belt 16 onto conveyor belts 18 and 19 and onto conveyor belt 20 which passes through freezer tunnel 21. If the patties are not flat prior to freezing, the edges of upwardly cupped patties will crack during packing after freezing. The flat patties pass through freezer tunnel 21 where they are frozen at a temperature on the order of 10° F. from which they pass onto metal detector table 22 to be packed into containers.

By utilizing the processing line of the invention, fully cooked, flat, and frozen sausage patties are obtained with a consistent texture and form which will retain a consistent tan color when they are subsequently heated on a grill in a restaurant for consumption by a customer. Cooking with radiant heat is a critical difference over cooking with steam since patties cooked with steam do not retain a consistent color when they are heated in a restaurant.

While a preferred embodiment of the invention has been described herein, it is to be understood that the invention may be embodied within the scope of the appended claims.

We claim:

1. In a continuous meat processing line having inlet and outlet ends, a patty-forming machine at the inlet end, a cooking portion, a transfer section having at least one conveyor belt, a freeze section and a packing section at the outlet end, the improvement comprising said cooking portion having a first cooking section aligned with said patty-forming machine and a second cooking section aligned with said first cooking section, said first cooking section having a conveyor belt with a discharge end and a receiving end for receiving patties from said patty-forming machine, means supporting said conveyor belt for movement in said first cooking section, means for driving said conveyor belt, at least one heating unit in said first cooking section located above said conveyor belt, said heating unit having a plurality of individual radiant heaters, a water tray located below said conveyor belt and said heating unit, said second cooking section having a conveyor belt with a discharge end and a receiving end for receiving patties from said discharge end of said conveyor belt in said first cooking section, means supporting said conveyor belt for movement in said second cooking section, means for driving said conveyor belt, at least one heating unit in said second cooking section located above said conveyor belt, said heating unit having a plurality of individual radiant heaters, a water tray located below said conveyor belt in said second heating section and said heating unit, said discharge end of said conveyor belt in said second cooking section discharging patties onto said conveyor belt in said transfer section for transfer to said freezer section, and means to drain said water trays.

2. In a meat processing line according to claim 1, adjustable rollers supporting said discharge end of said conveyor belt in said first cooking section, means for adjusting the vertical position of said adjustable rollers to adjust the height of said discharge end of said conveyor belt in said first cooking section, deflector means located below said discharge end of said conveyor belt in said first cooking section and above said receiving end of said conveyor belt in said second cooking section, whereby patties discharge from said discharge end of said conveyor belt in said first cooking section contact said deflector means and are turned over prior to contact with said receiving end of said conveyor belt in said second cooking section.

3. In a meat processing line as set forth in claim 1, a deflector located below said discharge end of said conveyor belt in said second cooking section and above the receiving end of said conveyor belt in said transfer section, whereby patties discharged from said discharge end of said conveyor belt in said second cooking section contact said deflector and are turned over prior to contact with the receiving end of said conveyor belt in said transfer section.

4. In a meat processing line according to claim 1, wherein said means supporting said conveyor belts in said first and second cooking sections is a plurality of substantially horizontal support rollers, a conveyor support frame in each of said cooking sections, said support frames having spaced side rails and aligned holes in said side rails, each of said support rollers extending through a pair of aligned holes in said side rails, one end of each of said support rollers formed with a flange having a diameter larger than the diameter of said holes, said flange located at the outer surface of one of said side rails, whereby said support rollers are free to expand and contract longitudinally and move relative to said side rails.

5. In a meat processing line according to claim 4, a plurality of spaced brackets supported on the exterior surface of said side rail which is adjacent to said flange on one end of said support rollers, elongated stop members supported in said brackets, whereby longitudinal expansion of said support rollers moves said flange on one end of said support rollers into contact with a stop member to prevent said support rollers from moving longitudinally to an extent that the ends of said support rollers in the opposite side rail fall out of the holes in the opposite side rail.

6. In a meat processing line as set forth in claim 1, wherein each of said heating units includes a separate frame, each of said frames including means carrying said individual radiant heaters, roller casters mounted on the bottom of each of said frames, whereby said separate frames and said heating units may be removed from said meat processing line for cleaning.

7. In a meat processing line according to claim 1, wherein each of said individual radiant heaters in said heating units has a housing, said housing having imperforate side walls, end walls and a top wall, the bottom wall of said housing comprising a first porous ceramic member and a metal grid located below and spaced from said porous ceramic member, an elongated tube extending through one of said end walls into the interior of said housing, a plurality of longitudinally and angularly spaced slots in said elongated tube, means for supplying a combustible gas-air mixture to said tube and to the interior of said housing through said slots in said tube, electric ignition means located within said housing, whereby a gas-air mixture flowing out of said plurality of slots into the interior of said housing is ignited by said electric ignition means and heats said ceramic member to radiate heat downwardly onto said conveyor belts in said first and second cooking sections.

8. In a meat processing line according to claim 7, wherein the end of said elongated tube outside of said housing is provided with flange means, means attaching said flange means to said one end wall of said housing to hold said elongated tube in place on said housing, a union attached to the outer end of said elongated tube and spaced therefrom, a gas nozzle extending from said union and axially aligned with said elongated tube and a pipe connected to said union to supply gas to said nozzle, whereby gas passing from said nozzle into the outer end of said elongated tube entrains air into said elongated tube and said gas-air mixture passes out of said tube through said elongated slots into said housing for combustion within said housing.

9. In a meat processing line according to claim 8, control means for gas flowing through said pipe to said nozzle and for said electric ignition means, said control means comprising an electric circuit having an on-off switch, a capacitor connected to said on-off switch and a solenoid control means connected to said on-off switch, a solenoid operated valve for controlling gas flow through said pipe to said nozzle, whereby when said solenoid opens said valve to permit gas to flow through said pipe to said nozzle and into said elongated tube and said housing, said electric ignition means is actuated by said capacitor in said circuit to spark within said housing and ignite the gas-air mixture flowing into said housing through said elongated slots in said tube.

10. In a meat processing line according to claim 9, wherein each of said individual radiant heaters in a heating unit has a separate control means and each of said control means includes an electric circuit having an on-off switch, a capacitor, a solenoid control means and a solenoid valve for controlling gas flow through said pipe to said nozzle.

11. In a meat processing line according to claim 10, a closed control cabinet, said control means for each of said individual radiant heaters in a heating unit being located within said closed control cabinet to protect said control means from dirt and grease created during cooking, said closed cabinet being provided with openings for movement of air into said cabinet to cool said control means and a wire mesh filter located in each of said openings to prevent the passage of dirt and grease into the interior of said cabinet.

12. A continuous meat processing line having a patty-forming machine, at least one cooking section adjacent to said patty-forming machine and a freeze section, said cooking section having a pervious conveyor belt with a discharge end and a receiving end for receiving patties from said patty-forming machine and discharging patties, means supporting said conveyor belt for movement through said cooking section, means for driving said conveyor belt, at least one heating unit in said cooking section, said heating unit having a plurality of individual radiant heaters located above and spaced from said conveyor belt, a water tray located below said conveyor belt and said heating unit and means to drain said tray, whereby patties on said conveyor belt in said cooking section are cooked by radiant heat from said individual radiant heaters.

13. A meat processing line according to claim 12, wherein said means supporting said conveyor belt in said cooking section is a plurality of substantially horizontal support rollers, a conveyor support frame in said cooking section, said support frame having spaced side rails and aligned holes in said side rails, each of said support rollers extending through a pair of aligned holes in said side rails, one end of each of said support rollers formed with a flange having a diameter larger than the diameter of said holes, said flange located at the outer surface of one of said side rails, whereby said support rollers are free to expand and contract longitudinally and move relative to said side rails.

14. A meat processing line according to claim 13, including a plurality of spaced brackets supported on the exterior surface of said side rail which is adjacent to said flange on one end of said support rollers, elongated stop members supported in said brackets, whereby longitudinal expansion of said support rollers moves said flange on one end of said support rollers into contact with a stop member to prevent said support rollers from moving longitudinally to an extent that the ends of said support rollers in the opposite side rail fall out of the holes in the opposite side rail.

15. A meat processing line as set forth in claim 12, wherein said heating unit includes a separate frame, said frame including means carrying said individual radiant heaters, roller casters mounted on the bottom of said frame, whereby said separate frame and said heating units may be removed from said meat processing line for cleaning.

16. A meat processing line according to claim 12, wherein each of said individual radiant heaters in said heating unit has a housing, said housing having imperforate side walls, end walls and a top wall, the bottom wall of said housing comprising a first porous ceramic member and a metal grid located below and spaced from said porous ceramic member, an elongated tube extending through one of said end walls into the interior of said housing, a plurality of longitudinally and angularly spaced slots in said elongated tube, means for supplying a combustible gas-air mixture to said tube and to the interior to said housing through said slots in said tube, electric ignition means located within said housing, whereby a gas-air mixture flowing out of said plurality of slots into the interior of said housing is ignited by said electric ignition means and heats said ceramic member to radiate heat downwardly onto said conveyor belt in said cooking section.

17. A meat processing line according to claim 16, wherein the end of said elongated tube outside of said housing is provided with flange means, means attaching said flange means to said one end wall of said housing to hold said elongated tube in place on said housing, a union attached to the outer end of said elongated tube and spaced therefrom, a gas nozzle extending from said union and axially aligned with said elongated tube and a pipe connected to said union to supply gas to said nozzle, whereby gas passing from said nozzle into the outer end of said elongated tube entrains air into said elongated tube and said gas-air mixture passes out of said tube through said elongated slots into said housing for combustion within said housing.

18. A meat processing line according to claim 17 including, control means for gas flowing through said pipe to said nozzle and for said electric ignition means, said control means comprising an electric circuit having an on-off switch, a capacitor connected to said on-off switch and a solenoid control means connected to said on-off switch, a solenoid operated valve for controlling gas flow through said pipe to said nozzle, whereby when said solenoid opens said valve to permit gas to flow through said pipe to said nozzle and into said elongated tube and said housing, said electric ignition means is actuated by said capacitor in said circuit to spark within said housing and ignite the gas-air mixture.

19. A meat processing line according to claim 18, wherein each of said individual radiant heaters in said heating unit has a separate control means and each of said control means includes an electric circuit having an on-off switch, a capacitor, a solenoid control means and a solenoid valve for controlling gas flow through said pipe to said nozzle.

20. A meat processing line according to claim 19, including a closed control cabinet, said control means for each of said individual radiant heaters in said heating unit being located within said closed control cabinet to protect said control means from dirt and grease created during cooking, said closed control cabinet being provided with openings for movement of air into said cabinet to cool said control means and a wire mesh filter located in each of said openings to prevent the passage of dirt and grease into the interior of said cabinet.

21. Equipment for cooking patties in a meat processing line, said equipment comprising a first cooking section and a second cooking section aligned with said first cooking section, said first cooking section having a conveyor belt with a discharge end and a receiving end for receiving patties, means supporting said conveyor belt for movement in said first cooking section, means for driving said conveyor belt, at least one heating unit in said first cooking section located above said conveyor belt, said heating unit having a plurality of individual gas fired radiant heaters, a water tray located below said conveyor belt, said second cooking section having a conveyor belt with a discharge end and a receiving end for receiving patties from said discharge end of said conveyor belt in said first cooking section, means supporting said conveyor belt for movement in said second cooking section, means for driving said conveyor belt, at least one heating unit in said second cooking section located above said conveyor belt, said heating unit having a plurality of individual gas fired radiant heaters, a water tray located below said conveyor belt in said second heating section, and means to drain said water trays.

22. Equipment as set forth in claim 21 including, adjustable rollers supporting said discharge end of said conveyor belt in said first cooking section, means for adjusting the vertical position of said adjustable rollers to adjust the height of said discharge end of said conveyor belt in said first cooking section, deflector means located below said discharge end of said conveyor belt in said first cooking section and above said receiving end of said conveyor belt in said second cooking section, whereby patties discharged from said discharge end of said conveyor belt in said first cooking section contact said deflector means and are turned over prior to contact with said receiving end of said conveyor belt in said second cooking section.

23. Equipment as set forth in claim 22 including, a deflector located below said discharge end of said conveyor belt in said second cooking section, whereby patties discharged from said discharge end of said conveyor belt in said second cooking section contact said deflector and are turned over.

24. Equipment as set forth in claim 21, wherein said means for supporting said conveyor belts in said first and second cooking sections is a plurality of substantially horizontal support rollers, a conveyor support frame in each of said cooking sections, said support frames having spaced side rails and aligned holes in said side rails, each of said support rollers extending through a pair of aligned holes in said side rails, one end of each of said support rollers formed with a flange having a diameter larger than the diameter of said holes, said flange located at the outer surface of one of said side rails, whereby said support rollers are free to expand and contract longitudinal and move relative to said side rails.

25. Equipment as set forth in claim 24 including, a plurality of spaced brackets supported on the exterior surface of said side rail which is adjacent to said flange on one end of said support rollers, elongated stop members supported in said brackets, whereby longitudinal expansion of said support rollers moves said flange on one end of said support rollers into contact with a stop member to prevent said support rollers from moving longitudinally to an extent that the ends of said support rollers in the opposite side rail fall out of the holes in the opposite side rail.

26. Equipment as set forth in claim 21, wherein each of said heating units includes a separate frame, each of said frames including means carrying said individual radiant heaters, roller casters mounted on the bottom of each of said frames, whereby said separate frames and said heating units may be removed from said meat processing line for cleaning.

27. Equipment as set forth in claim 21, wherein each of said individual radiant heaters in said heating units has a housing, said housing having imperforate side walls, end walls and a top wall, the bottom wall of said housing comprising a first porous ceramic member and a metal grid located below and spaced from said porous ceramic member, an elongated tube extending through one of said end walls into the interior of said housing, a plurality of longitudinally and angularly spaced slots in said elongated tube, means for supplying a combustible gas-air mixture to said tube and to the interior of said housing through said slots in said tube, electric ignition means located within said housing, whereby a gas-air mixture flowing out of said plurality of slots into the interior of said housing is ignited by said electric ignition means and heats said ceramic member to radiate heat downwardly onto said conveyor belts in said first and second cooking sections.

28. Equipment as set forth in claim 27 including, control means for gas flowing to said tube and for said electric ignition means, said control means comprising an electric circuit having an on-off switch, a capacitor connected to said on-off switch and a solenoid control means connected to said on-off switch, a solenoid operated valve for controlling the flow of gas to said tube, whereby when said solenoid opens said valve to permit gas to flow to said tube and said housing, said electric ignition means is actuated by said capacitor in said circuit to spark within said housing and ignite the gas-air mixture.

29. Equipment as set forth in claim 28, wherein each of said individual radiant heaters in a heating unit has a separate control means and each of said control means includes an electric circuit having an on-off switch, a capacitor, a solenoid control means and a solenoid valve for controlling gas flow to said tube.

30. Equipment as set forth in claim 29 including a closed control cabinet, said control means for each of said individual radiant heaters in a heating unit is located within said closed control cabinet to protect said control means from dirt and grease created during cooking, said closed control cabinet being provided with openings for movement of air into said cabinet to cool said control means and a wire mesh filter located in each of said openings to prevent dirt and grease from entering the interior of said cabinet.

* * * * *